(12) United States Patent
Mita et al.

(10) Patent No.: US 7,658,519 B2
(45) Date of Patent: Feb. 9, 2010

(54) DISPLAY DEVICE

(75) Inventors: Chikara Mita, Saitama (JP); Shigeru Egami, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 237 days.

(21) Appl. No.: 11/723,593

(22) Filed: Mar. 21, 2007

(65) Prior Publication Data

US 2007/0230170 A1 Oct. 4, 2007

(30) Foreign Application Priority Data

Mar. 30, 2006 (JP) .............................. 2006-093218
Sep. 26, 2006 (JP) .............................. 2006-260543

(51) Int. Cl.
*B60Q 3/00* (2006.01)

(52) U.S. Cl. ........................ 362/482; 362/559; 362/560; 362/23

(58) Field of Classification Search ............. 362/23–30, 362/559, 560, 482, 546–545

See application file for complete search history.

(56) References Cited

U.S. PATENT DOCUMENTS

| | | | |
|---|---|---|---|
| 6,417,779 B1 * | 7/2002 | Noll et al. .............. | 340/815.65 |
| 6,502,952 B1 * | 1/2003 | Hartley .................. | 362/184 |
| 6,952,079 B2 * | 10/2005 | Shiang et al. ............... | 313/506 |
| 7,406,785 B2 * | 8/2008 | Noguchi ...................... | 40/442 |
| 2003/0012008 A1 * | 1/2003 | Chang et al. .................. | 362/27 |
| 2004/0120140 A1 | 6/2004 | Fye et al. | |

FOREIGN PATENT DOCUMENTS

| | | |
|---|---|---|
| DE | 44 31 667 A1 | 3/1996 |
| EP | 0 803 711 A1 | 10/1997 |
| EP | 1 575 017 A1 | 9/2005 |
| JP | 11-85062 A | 3/1999 |
| JP | 2001-100679 A | 4/2001 |

\* cited by examiner

*Primary Examiner*—Sandra L O'Shea
*Assistant Examiner*—Danielle Allen
(74) *Attorney, Agent, or Firm*—Foley & Lardner LLP

(57) ABSTRACT

A display device includes a first light source for emitting first light in blue, a second light source for emitting second light, and a color filter. The filter has a translucent sheet, a first printed area part for passing the first light to provide a first display excluding an overlapped portion of the first display and a second display and preventing the second light from passing therethrough, a second printed area part for passing the second light to provide the second display excluding the overlapped portion and preventing the first light from passing therethrough, a third printed area part for dimming and passing the first and second lights to provide the overlapped portion, a background printed area part for preventing the first and second lights from passing therethrough, and a white light converting part for the first light passing therethrough into white light.

11 Claims, 14 Drawing Sheets

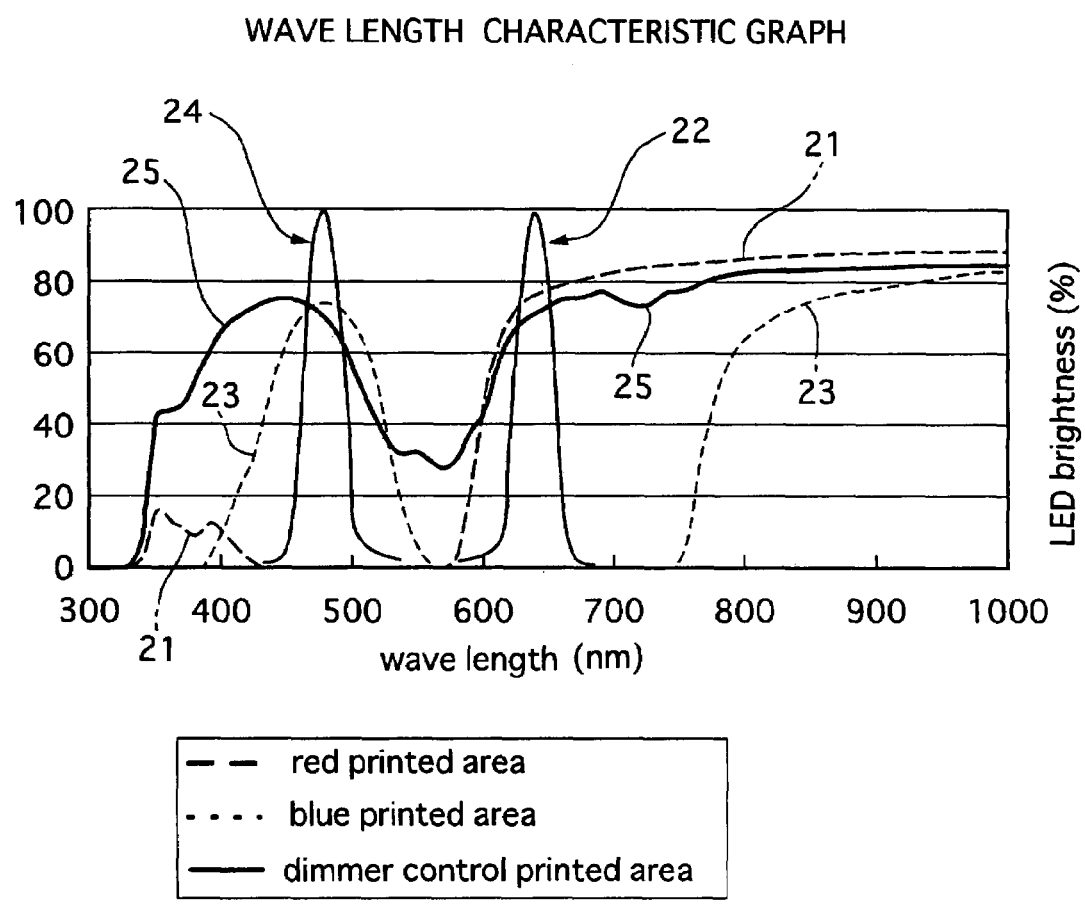

FIG. 13
When passing through red filter
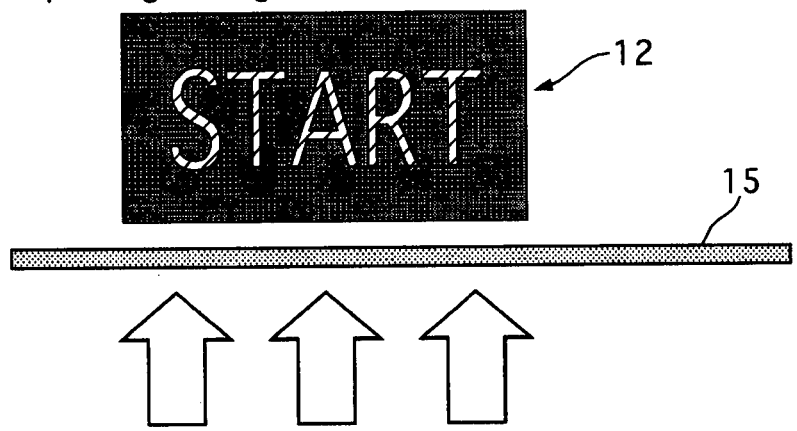
When passing through fluorescent filter
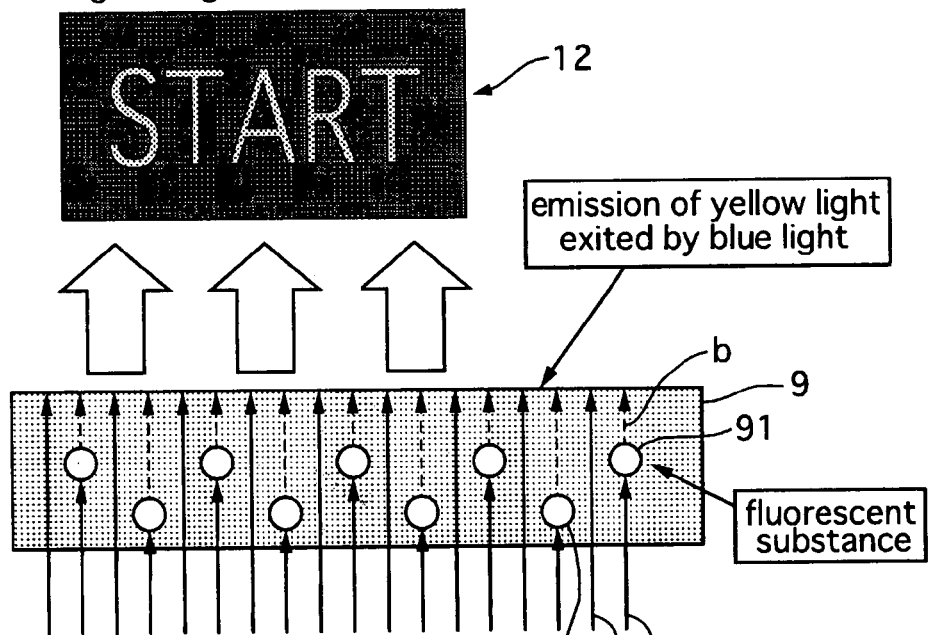
emission of yellow light exited by blue light
fluorescent substance
When passing through color filter
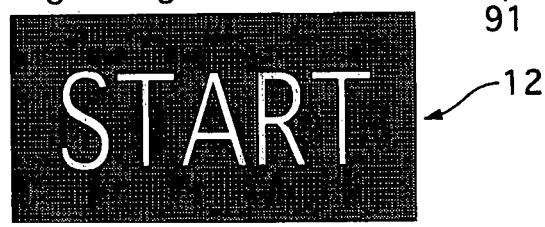

DISPLAY DEVICE

BACKGROUND OF THE INVENTION

1. Field of the Invention

The present invention relates to a display device that is capable of shifting different display contents on an identical display surface of the display device.

2. Description of the Related Art

A display device of this kind is disclosed in Japanese patent laying-open publication No. 2001-100679. This display device has a first printed area through which only blue light can pass and a second printed area through which only green light can pass, the other printed area to form a lightproof background, which are formed by printing on a rear surface of a transparent sheet that is illuminated from a rear side of the sheet by a first light source of blue light and a second light source of green light.

The above known conventional display device, however, encounters a problem in insufficiency of display performances. The ability to provide colors of a display is limited, and especially it is very difficult to provide a display in white. White is very useful, because it can easily produce other colors to improve display ability of the display device by passing it through a desired-color filter.

It is, therefore, an object of the present invention to provide a display device which overcomes the foregoing drawbacks and can improve its display ability, including produce of light in white.

SUMMARY OF THE INVENTION

According to a first aspect of the present invention there is provided a display device that selectively provides a first display and a second display, the display device including a first light source for emitting first light in blue, a second light source for emitting second light with peak wavelength different from the wavelength of the first light, and a color filter. The color filter has a translucent sheet that is hit selectively by one of the first and second lights. The translucent sheet is provided thereon with a first printed area part which is capable of passing the first light to provide the first display excluding an overlapped portion of the first display and the second display and preventing the second light from passing through the first printed area part, a second printed area part which is capable of passing the second light to provide the second display excluding the overlapped portion and preventing the first light from passing through the second printed area part, a third printed area part which is capable of dimming and passing the first light and the second light to provide the overlapped portion, a background printed area part which is capable of preventing the first light and the second light from passing through the background printed area part, and a white light converting part which is capable of converting the first light passing through the white light converting part into white light. The white light converting part is provided on a display side, namely a front side, thereof with an additive color filter which is capable of changing the white light to another color light.

Therefore, this display device can improve the display ability, including the light in white color. In addition, other color, different from the white light can be easily obtained, including from a display in color closer to color of the first light, the second light, or the white light to that in color significantly different from those lights. Using the white light, for passing through the additive color filter in order to obtain other colors, can easily expand the number of colors adaptable for the displays, thereby improving its display ability of the display device.

Preferably, the white light converting part is a fluorescent filter.

Therefore, the display in white can be easily obtained, which can improve display performance.

Preferably, the additive color filter produces the first display in the substantially same color as color of the second display.

Therefore, the first display and the second display can be provided in the substantially same colors, which is suitable for providing the displays which belong to the same category or to similar categories for example.

Preferably, the additive color filter produces the first display in color different from color of the second display.

Therefore, the first display and the second display can be provided in colors different from each other, which is suitable for providing the displays which belong to different categories for example.

According to another aspect of the present invention there is provided a display device that selectively provides a first display and a second display, the display device including a first light source for emitting first light in blue, a second light source for emitting second light with peak wavelength, different from wavelength of the first light, a color filter and a smoked filter. The color filter has a translucent sheet that is hit selectively by one of the first and second lights. The translucent sheet is provided thereon with a first printed area part which is capable of passing the first light to provide the first display excluding an overlapped portion of the first display and the second display and preventing the second light from passing through the first printed area part, a second printed area part which is capable of passing the second light to provide the second display excluding the overlapped portion and preventing the first light from passing through the second printed area part, a third printed area part which is capable of dimming and passing the first light and the second light to provide the overlapped portion, a background printed area part which is capable of preventing the first light and the second light from passing through the background printed area part, and a white light converting part which is capable of converting the first light passing through the white light converting part into white light. The smoked filter has a low translucency of light. The first to third printed area parts, the white light converting part and the smoked filter are arranged in order thereof to form a layer structure so that broadening of the first and second lights passing through the printed area parts and entering the fluorescent filter can be suppressed.

Therefore, this display device can improve the display ability, including the light in the white color. In addition, the broadening of the first and second lights can be suppressed, thereby decreasing obscure portions of the first and second displays.

BRIEF DESCRIPTION OF THE DRAWINGS

The objects, features and advantages of the present invention will become apparent as the description proceeds when taken in conjunction with the accompanying drawings, in which:

FIG. 5 is a characteristic diagram showing a relationship between characteristics of the printed area parts formed on the color filter and wavelengths of the first and second light sources;

FIG. 13 is a diagram explaining changes of first light into red when it passes through a color filter, a fluorescent substance, a fluorescent filter and a red-colored filter;

DETAILED DESCRIPTION OF THE PREFERRED EMBODIMENTS

Figure 1:
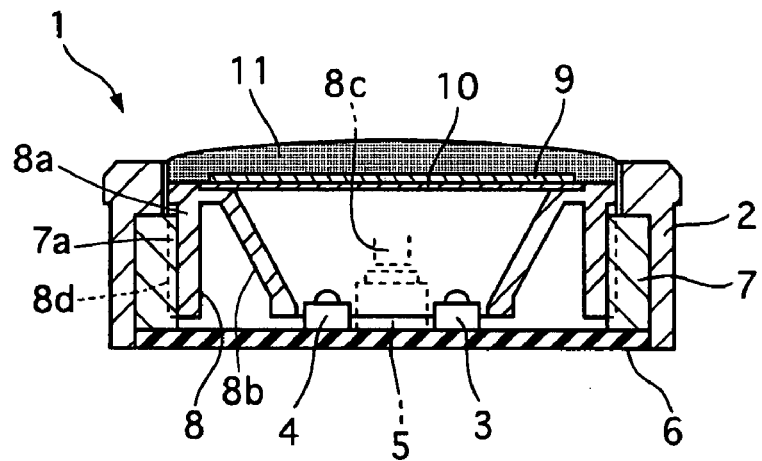
FIG. 1 is a cross sectional side view showing a switch with a display device of a first embodiment according to the present invention.

Throughout the following detailed description, similar reference characters and numbers refer to similar elements in all figures of the drawings, and their descriptions are omitted for eliminating duplication.

Referring to FIGS. 1 to 4B of the drawings, there is shown a first preferred embodiment of a display device, which is adapted for a switch 1, according to the present invention. In this embodiment, the display device can selectively provide two displays, namely two characters in different colors, according to pressing of the switch 1.

As shown in FIG. 1, the switch 1 has a switch finisher 2, a guide member 7 fixed to a lower and inner part of the switch finisher 2, and a slider 8 arranged inside the switch finisher 8 and capable of sliding rearward and forward along the guide member 7.

The switch finisher 2 is shaped like a square-tube, and the guide member 7 is shaped like a square-tube smaller than the switch finisher 2 to be fixed in an inner part of the switch finisher 2 at this rear side.

The guide member 7 is formed on at least two facing inner surfaces thereof with rail portions 7a that expand in a back and front direction to receive projections 8d formed on outer side-wall surfaces of the slider 8.

The switch finisher 2 and the guide member 7 are fixed at their rear portions by a base plate 6 so that their rear openings are closed up. The base plate 7 is provided with a first light source 3, a second light source 4, a tact switch 5, and a not-shown electronic circuit on its front surface.

The first light source 3 is constructed so as to cast first light in blue having a peak wavelength of about 470 nm as indicated by a line 24 in FIG. 5, and the second light source 4 is constructed so as to cast second light in red having a peak wavelength of about 640 nm as indicated by a line 22 in FIG. 6. These light sources 3 and 4 are made of different-color light emitting diodes (LEDs), which are preferable for a low cost and easy maintenance. The light sources 3 and 4 may be made of other devices.

The slider 8 has a side-wall portion 8a to form a square tube, and an inner slanted wall portion 8b arranged inside of and integrally formed with the side-wall portion 8a. The inner slanted wall portion 8a is shaped like a quadrangular-pyramid tube so that its opening becomes narrower from its front end toward its rear end. The rear end opening of the inner slanted wall portion 8b is formed so that the light sources 3 and 4 are positioned in the rear end opening, while the tact switch 5 is positioned out of the rear end opening and between the inner slanted wall portion 8b and the side-wall portion 8a.

The slider 8 is fixed at its front edge side and inside thereof with a color filter 10 having a plurality of printed area parts 10a to 10d, which will be described in detail later.

A fluorescent filter 9 is arranged on front surfaces of the printed area parts of the color filter 10. The fluorescent filter 9 is referred to as an yttrium aluminium garnet (YAG) sheet. Incidentally, the fluorescent filter 9 corresponds to a white color converting part of the present invention.

A smoked lens 11 is arranged on a front surface of the fluorescent filter 9 and the front surface of a protruding portion of the color filter 10 to cover them. The smoked lens 11 has a low translucency in its whole area so that he or she can not see printed patterns of the printed area parts 10a to 10d of the color filter 10 through the smoked lens 11 in an outside light at lights-out time. Note that the smoked lens 11 is illustrated to be flat in FIGS. 3, 6A, 7A and 8A for the sake of simplicity, and its configuration may be arbitrary according to its purpose. Incidentally, the smoked lens corresponds to a smoked filter of the present invention.

The tact switch 5 is switchable between ON and OFF according to backward and forward movement of the slider 8. Specifically, the tact switch 5 is kept in contact with a projecting portion 8c projected rearward from an outer surface of the inner slanted wall portion 8b for switching. When a user presses a front surface of the smoked lens 11, the slider 8 moves back together with the smoked lens 11, the fluorescent filter 9 and the color filter 10 along the rail portions 7a of the guide member 7. This causes the projecting portion 8c of the slider 8 to press the tact switch 5. Then, when the user releases the smoked lens 11 from being pressed, the tact switch 5 pushes forward and moves the slider 8 to its original position by reaction force of the tact switch 5.

Figure 2:
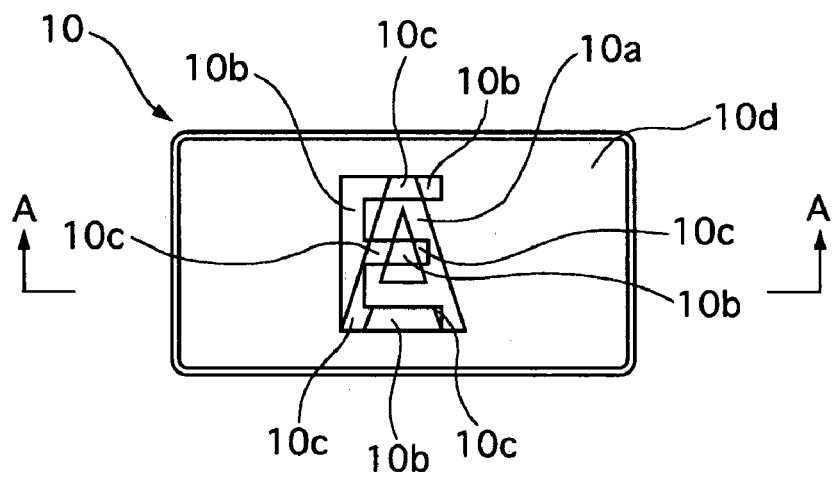
FIG. 2 is a plain view of a color which has filter printed area parts for displaying two characters "E" and "A" and is used in the display device shown in FIG. 1.

As shown in FIG. 2, the color filter 10 is made of a transparent sheet 10e with the printed area parts: a first printed area parts 10a, a second printed area parts 10b, a third printed area parts 10c and a background printed area parts 10d.

Figure 3:
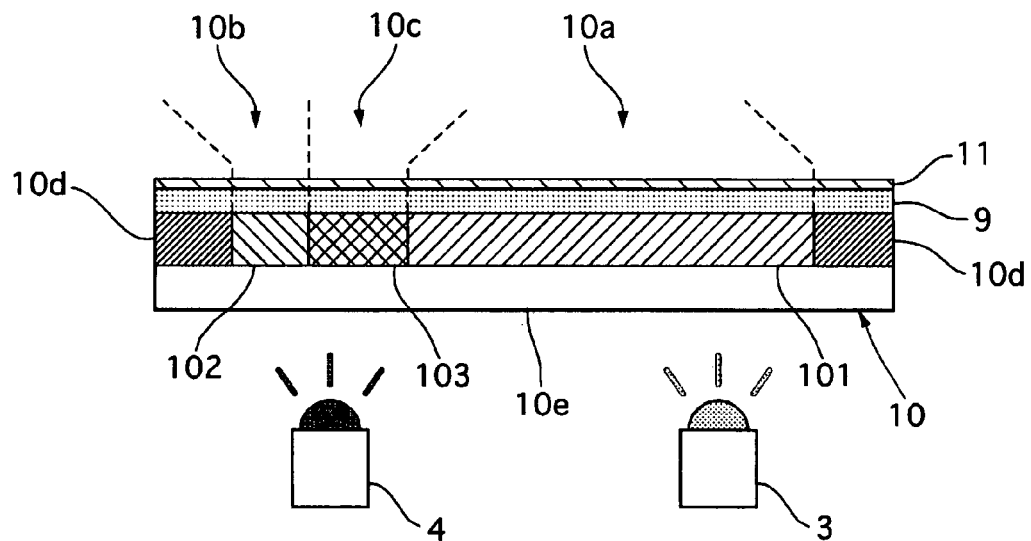
FIG. 3 is a cross-sectional view, taken on line A-A of FIG. 2, of the color filter with the printed area parts and two light sources.
Figure 4A:
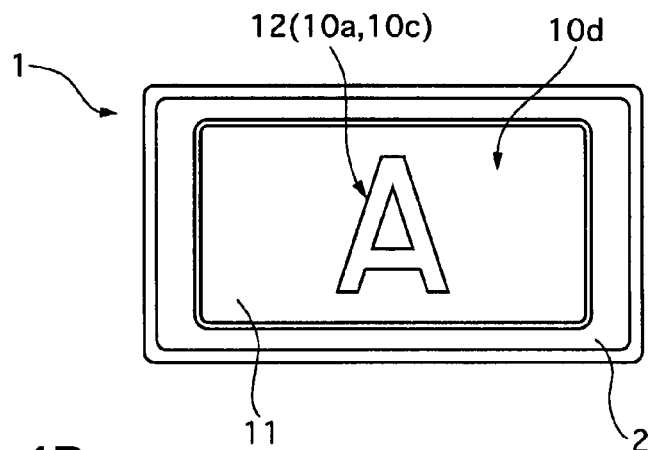
FIG. 4A is a plan view of the color filter when a first light source is ON and a second light sources is OFF to display the character "A" in white.

The first printed area parts 10a are formed on the front surface of the transparent sheet 10e to provide a first display indicating a first character "A" excluding overlapped portions of the first character "A" and a second character "E". The first character "A" is provided as shown in FIG. 4A. The first printed area parts 10a correspond to overlapped portions of blue printed area parts 101 and fluorescent filter 9 as shown in FIG. 3. The blue printed parts 101 are set to have a transmission efficiency characteristic, with respect to wavelength of light, which is indicated by a line 23 in FIG. 5, so that it can pass the first light, namely blue light in this embodiment.

Figure 4B:
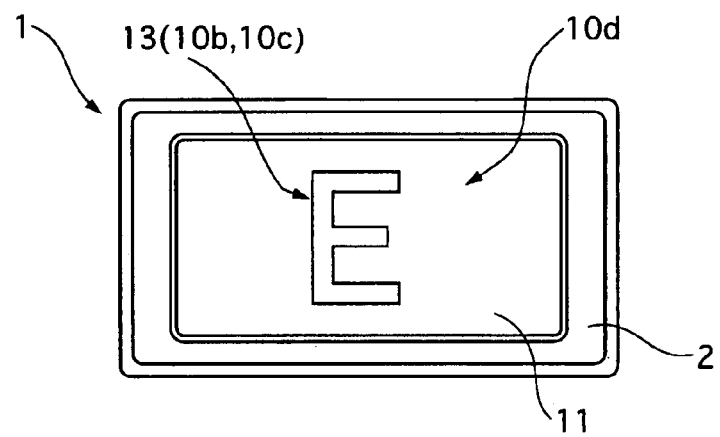
FIG. 4B is a plan view of the color filter when the first light source is OFF and the second light source is ON to display the character "E" in red.

The second printed area parts 10b are formed on the front side of the transparent sheet 10e to provide the second character "E", as a second display, excluding the overlapped portions of the first and second characters "A" and "E". The second character "E" is provided as shown in FIG. 4B. The second printed area parts 10b correspond to overlapped portions of red printed area portions 102 and the fluorescent filter 9 as shown in FIG. 3, although the fluorescent filter 9 may be removed because of no necessity of its function. The red printed area parts 102 are set to have a transmission efficiency characteristic, with respect to the wavelength of light, which is indicated by a line 21 in FIG. 5, so that it can pass the second light, namely red light in this embodiment.

The third printed area parts 10c are formed on the front surface of the transparent sheet 10e to provide overlapped portions of the first and second characters "A" and "E". The third printed area parts 10c correspond to a dimmer control printed area parts 103 and the fluorescent filter 9 as shown in FIG. 3, although the fluorescent filter 9 may be removed because of no necessity of its function. The dimmer control printed area parts 103 are set to have a transmission efficiency characteristic, with the wavelength of light, which is indicated by a line 25 in FIG. 5, so that the first and second lights are dimmed when they pass therethrough.

The background printed area parts 10d are formed on the front surface of the transparent sheet 10e to provide a background of the characters "A" and "E". The background printed area parts 10d are painted in black so that it absorbs the first and second lights when they are subjected to the lights.

The operation and advantages of the switch 1 with the display device of the first embodiment will be described.

Figure 6A:
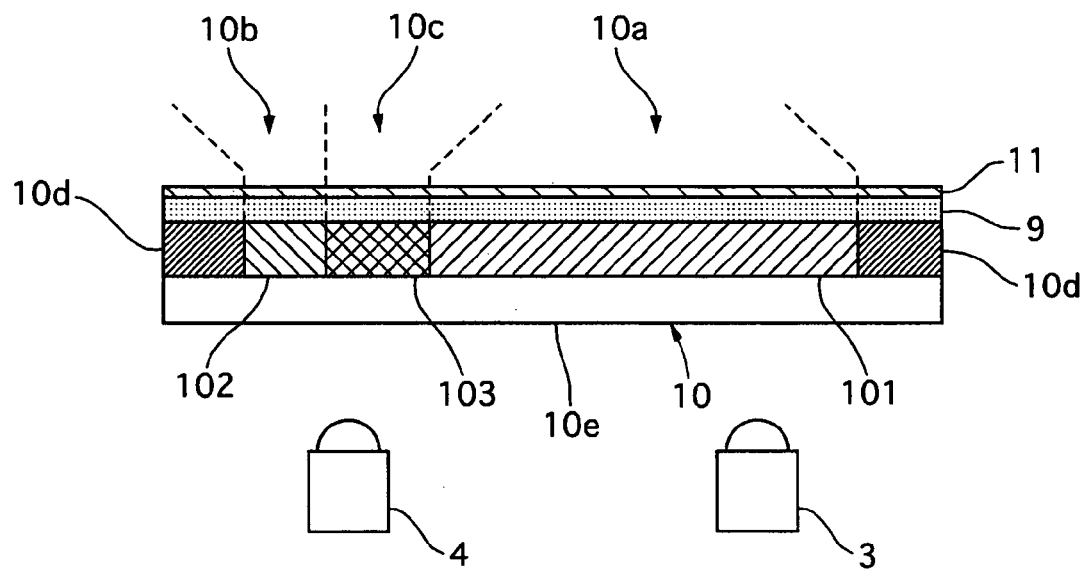
FIG. 6A is a cross-sectional side view of the color filter, which is not hit by the first and second lights, when the first and second lights are OFF.
Figure 6B:
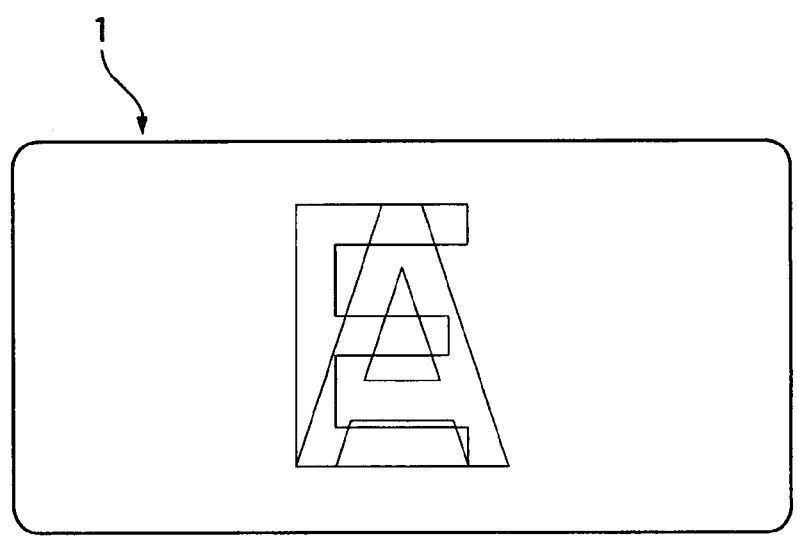
FIG. 6B is a plan view of the color filter displaying no characters in a state of FIG. 6A.

When electric power is not supplied to the electric circuit of the display device, as shown in FIG. 6A, the first light source 3 and the second light source 4 are not supplied with electric power, so that no light are emitted from the light sources 3 and 4. The smoked lens 11 suppresses light inside the display device, brightness of reflected light and ultraviolet light included in outside light, which can prevent a display mechanism arranged inside the display device and its display from being seen from an exterior thereof as shown in FIG. 6B. This improves visual qualities of the display device.

When the smoked lens 11 is pressed, the slider 8 moves rearward along the guide member 7 together with the smoked lens 11 to push the tact switch 5. The electronic circuit on the base plate 6 detects input signal of the tact switch 5 to shift the first and second displays as follows, as long as the electric power is supplied.

Figure 7A:
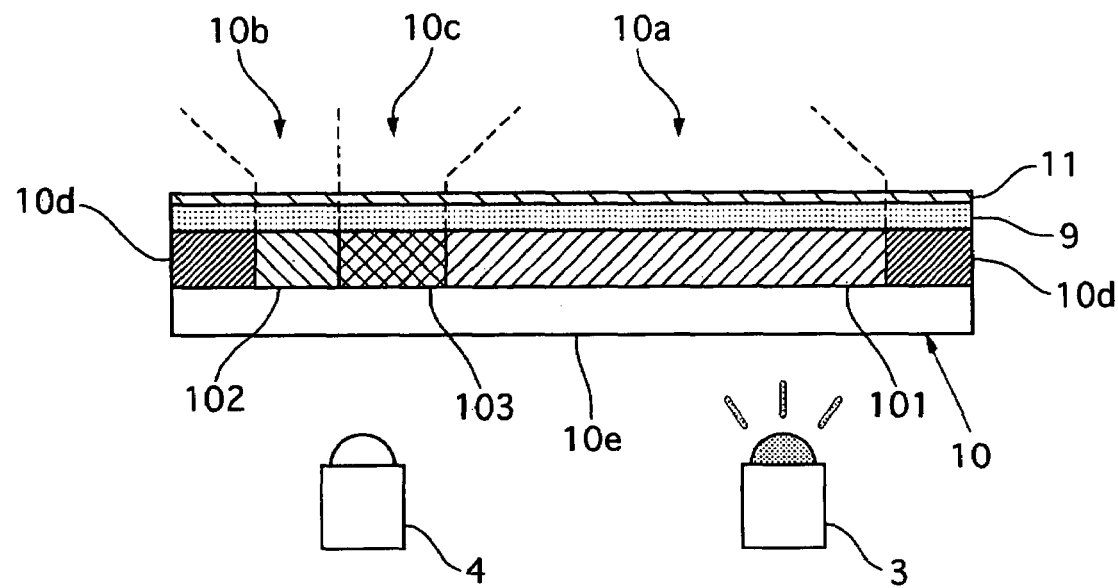
FIG. 7A is a cross-sectional side view of the color filter, which is hit by the first light, when the first light source is ON and the second light is OFF.

In order to provide the first display 12, as shown in FIG. 7A, the first light source 3 is supplied with the electric power to light up, while the second light source 4 is not supplied with the electric power, by an operation of the tact switch 5. The blue light is emitted from the first light source 3 in all possible directions, and travels forward directly and under reflection on an inner surface of the inner slanted wall portion 8b of the slider 8. This light hits the transparent sheet 10e from its rear side and passes therethrough to the first to third printed area parts 10a to 10c and the background printed area parts 10d as follows.

In this state, the blue printed area parts 101 pass the blue light to brighten the first printed area parts 10a in blue, because the first light source 3 casts the blue light as indicated by the line 24 in FIG. 5 and the first printed area parts 10a have the filter transmission efficiency indicated by the dot line 23 in FIG. 5.

In this case, the red printed area parts 102 prevent transmittance of the blue light emitted from the first light source 3 to produce no display on the second printed area parts 10b, because the first light source 3 casts the blue light as indicated by the line 24 in FIG. 5 and the second printed area parts 10b have the filter transmission efficiency indicated by the dot line 21 in FIG. 5.

The dimmer control printed area parts 103 suppress brightness of the blue light to brighten the third printed area parts 10c in blue slightly adding red, because the first light source 3 casts the blue light as indicated by the line 24 in FIG. 5 and the third printed area parts 10c have the filter transmission efficiency indicated by the dot line 25 in FIG. 5. The first light source 3 which can emit light whose peak of wavelength becomes shorter than that of the embodiment shown in FIG. 5 is preferably employed to remove reddish component parts of the light passing through the dimmer control printed area parts 103.

The background printed area parts 10d prevents the blue light from passing therethrough, accordingly producing no display thereon.

Then the blue lights outputted from the blue printed area parts 101 and the dimmer control printed area parts 103 produce the first display 12, the first character "A", passing through the fluorescent filter 9.

Figure 7B:
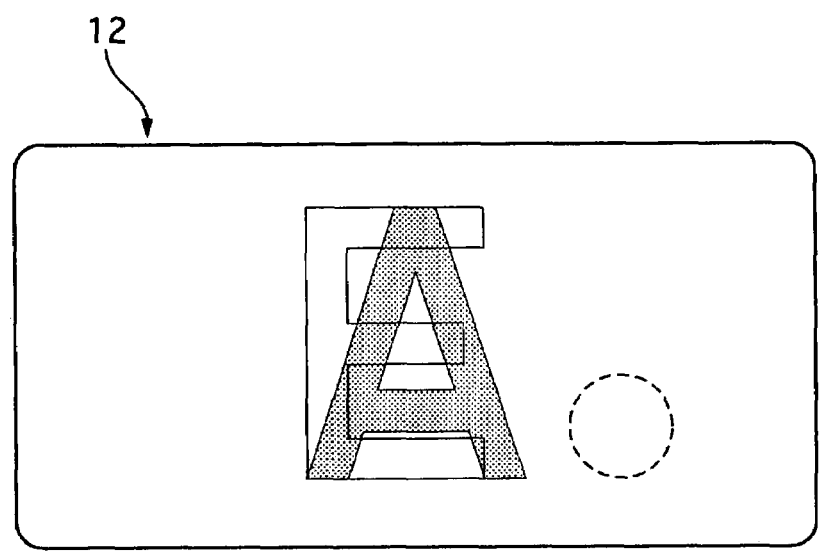
FIG. 7B is a plan view of the color filter displaying the character "A" in white in a state of FIG. 7A.
Figure 9:
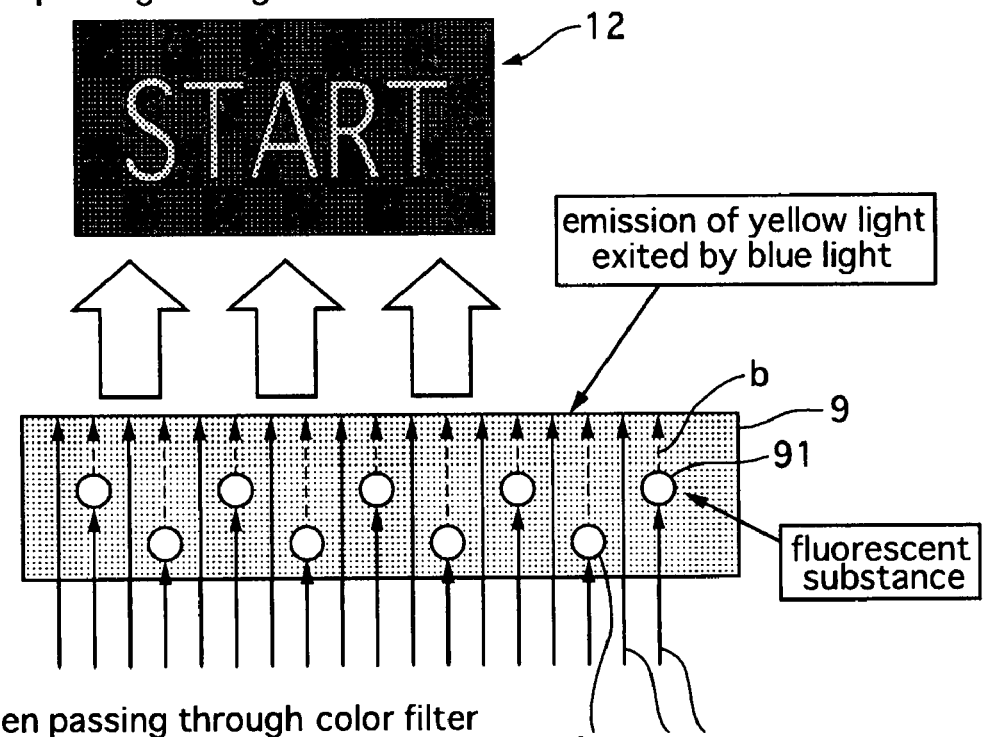
FIG. 9 is a diagram explaining changes of the first light into white when it passes through the color filter, a fluorescent substance and a fluorescent filter.
Figure 10:
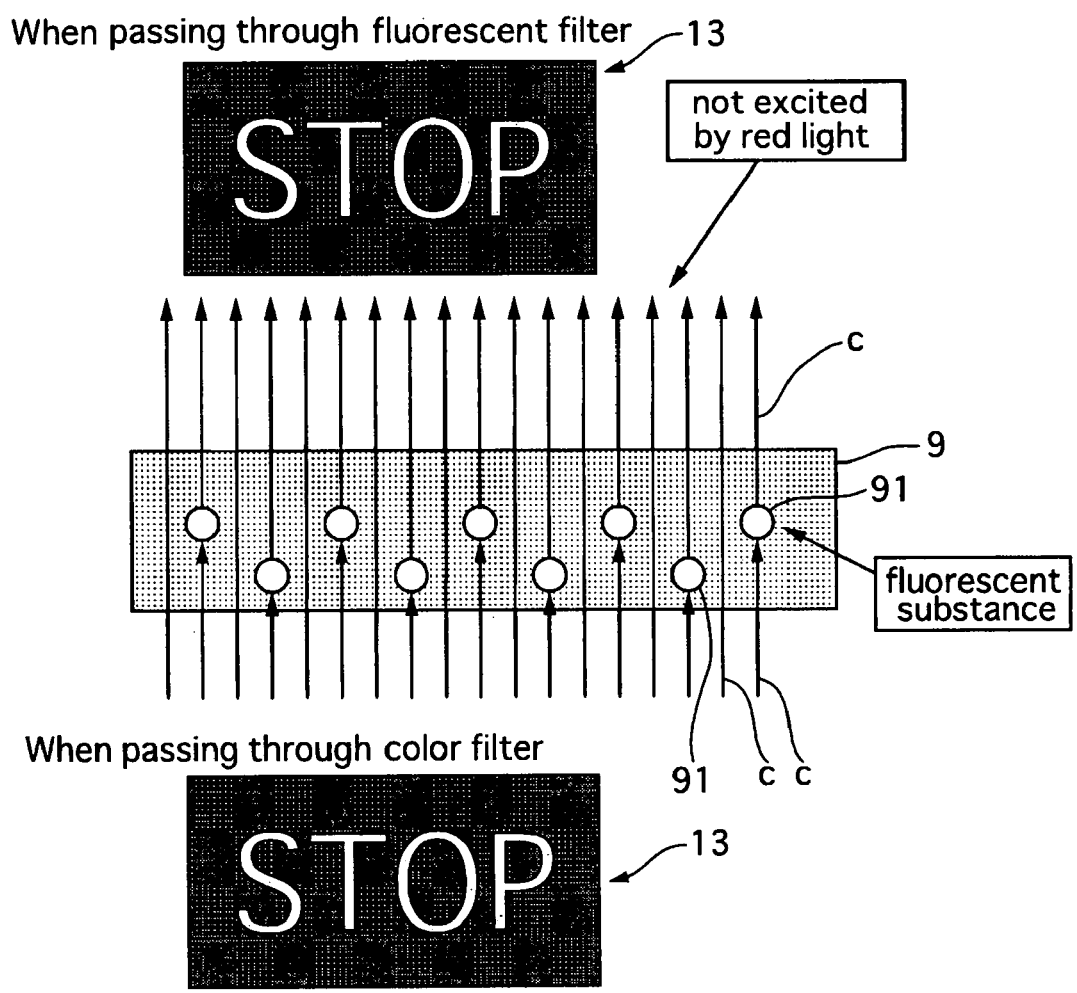
FIG. 10 is a diagram explaining no change of the second light when it passes though the color filter, the fluorescent substance and the fluorescent filter.

As shown in FIG. 9, inside the fluorescent filter 9, its fluorescent substance 91 contained therein is erected to emit yellow light when it is hit by some of the blue light. The rest of the blue light passes through the fluorescent filter 9 without changing its color. The yellow light is indicated by "b" and the blue light is indicated by "a" in FIG. 9, respectively. Consequently, the yellow light, which is produced by hit on the fluorescent substance 91, and the blue light, which is not hit thereon pass through the fluorescent filter 9, pass through the fluorescent filter 9 and the smoked lens 11 to travel toward eyes of a user, and accordingly he or she can see the first display, the first character "A" in white, as shown in FIG. 7B, because of the additive color process according to the principle of three primary colors of light.

Figure 11:
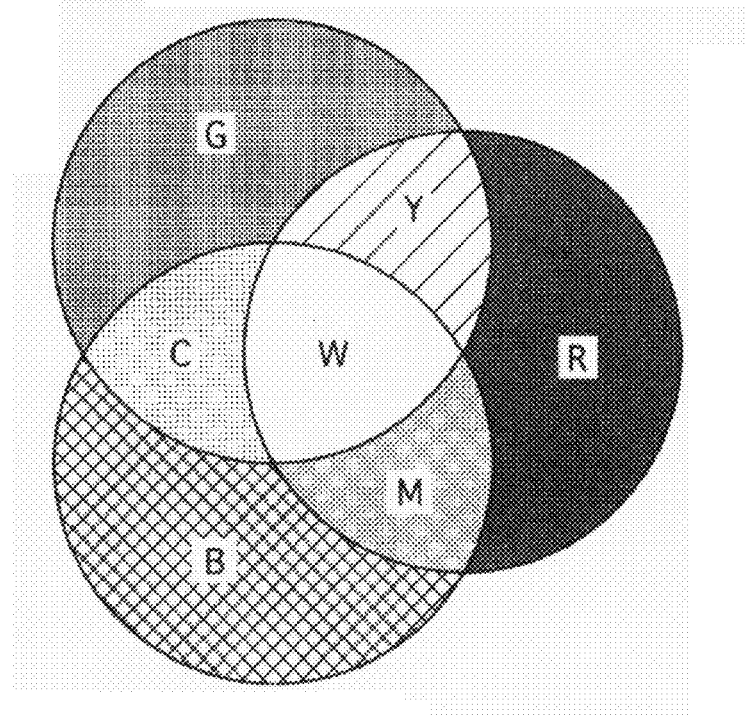
FIG. 11 is a diagram explaining three primary colors of light and their additive color processes.

FIG. 11 shows the principle of three primary colors of light, where three primary colors of light are red (R), green (G) and blue (B). Additive colors of green (G) and red (R) produces yellow (Y), and accordingly additive colors of yellow (Y) and blue (B) produce white (W). Therefore, the first display 12, namely the first character "A", is displayed in white as shown in FIG. 7B.

Figure 8A:
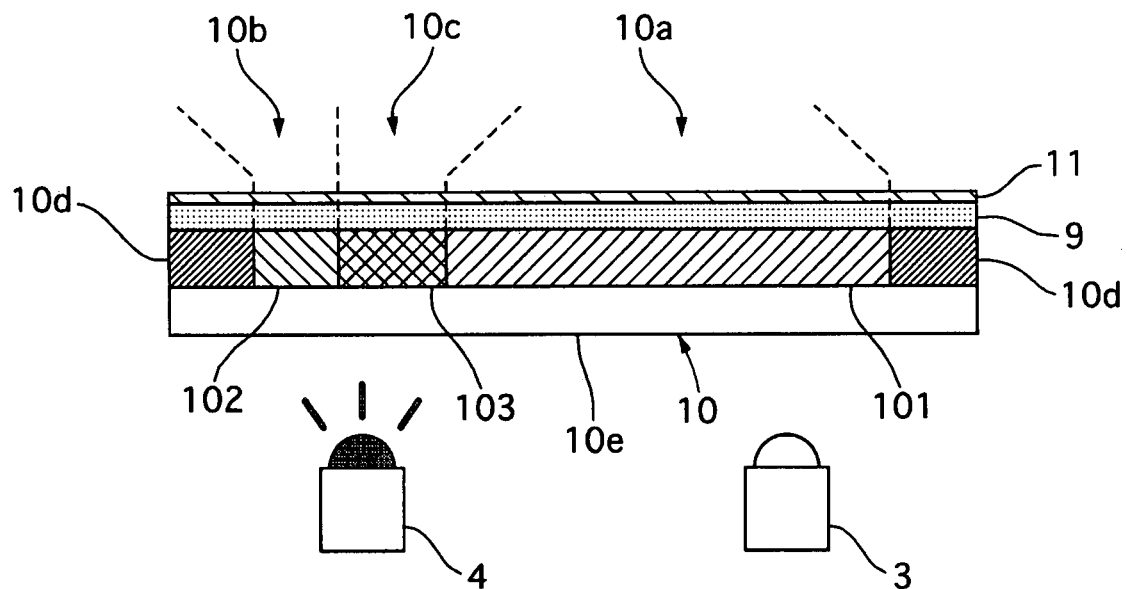
FIG. 8A is a cross-sectional side view of the color filter, which is hit by the second light, when the first light source is OFF and the second light is ON, and FIG. 8B is a plan view of the color filter displaying the character "E" in red in a state of FIG. 8A.

Next, in order to obtain the second display 13, the smoked lens 11 is pressed in the state where the first display 12 is produced. Then tact switch 5 is shifted to turn off the electricity supplied to the first light source 3 and turn on the electricity supplied to the second light source 4 to emit the red light toward the color filter 10 as shown in FIG. 8A. The red light hit the first to third printed area, parts 10a to 10c and the background printed area parts 10d as follows.

The blue printed area parts 101 prevent transmittance of the red light emitted from the second light source 4 to produce no display on the first printed area parts 10a, because the second light source 4 casts the red light as indicated by the line 22 in FIG. 5 and the first printed area parts 10a have the filter transmission efficiency indicated by the dot line 23 in FIG. 5.

In this case, the red printed area parts 102 pass the red light to brighten the second printed area parts 10b in red, because the second light source 4 casts the blue light as indicated by the line 22 in FIG. 5 and the second printed area parts 10b have the filter transmission efficiency indicated by the dot line 21 in FIG. 5.

The dimmer control printed area parts 103 suppress brightness of the red light to brighten the third printed area parts 10c in blue slightly adding blue, because the second light source 4 casts the red light as indicated by the line 22 in FIG. 5 and the third printed area parts 10c have the filter transmission efficiency indicated by the dot line 25 in FIG. 5. The second light source 4 which can emit light whose peak of wavelength becomes longer than that of the embodiment shown in FIG. 5 is preferably employed to remove bluish component parts of the light passing through the dimmer control printed area parts 103.

The background printed area parts 10d prevents the red light from passing therethrough, accordingly producing no display thereon.

Then the red lights outputted from the red printed area parts 102 and the dimmer control printed area parts 103 produce the second display 13, the second character "E", passing through the fluorescent filter 9.

Figure 8B:
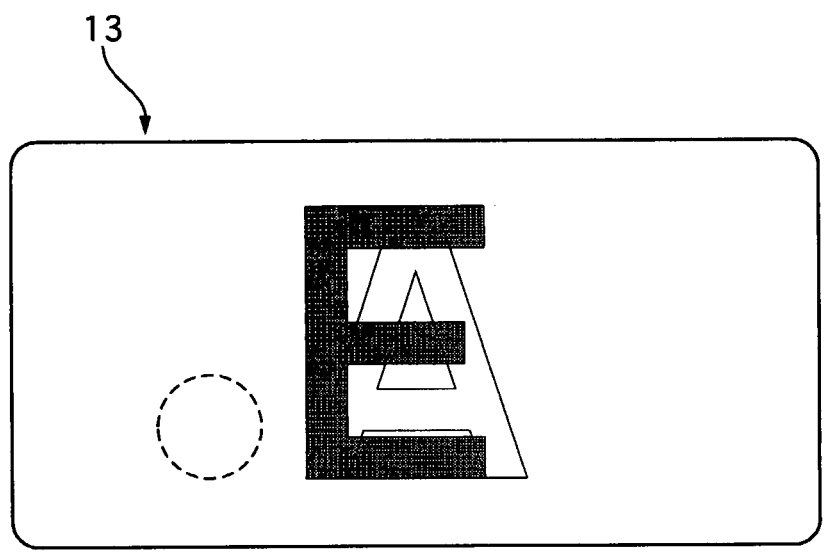

The fluorescent substance 91 is hit by some of the red light, while it is not erected, so that the red light is not changed, passing through the fluorescent filter 9. Therefore, the second display 13, namely the second character "E" is displayed in red as shown in FIG. 8B.

The display device of the first embodiment has the following advantages.

The device is constructed to include the first light source 13, the second light source 14, and the color filter 10 with the first to third printed area 10a to 10c, the background printed area parts 10d and the fluorescent filter 9 arranged on the front side of the color filter 10, where the first printed area parts 10a passes the first light (the blue light in the first embodiment) therethrough and blocks off the second light (the red light in the first embodiment), the second printed area parts 10b blocks off the first light and passes the second light therethrough, the third printed area parts 10c passes the brightness of the first and second light, suppressing them, and the background printed area parts 10d blocks off the first and second lights. Therefore, the first display 12 in white can be produced by supplying the electric power to the first light source 3 and cutting the electric power supplied to the second light source 4, while the second display 13 in red can be produced by cutting the electric power supplied to the first light source 3 and supplying the electric power to the second light source 4. This can improve its display ability.

Incidentally, white is most contrasty against black which is used as the background of the first display 12 so that the first display is easily viewable. In addition, use of displays in white are increasing in switches and the like used in a passenger compartment of luxury cars, and accordingly the display device of the first embodiment can respond to expectations thereof.

The fluorescent filter 9 changes the blue light into white light so as to act as the white color converting part. Some of the blue light is converted into the yellow light, and is mixed up with the rest of the blue light, converting the lights into the white light. This can be obtained by a small device and suppressing the numbers of parts, improving the display ability.

The switch 1 with the display device can be selectively operated to shift two displays, which is suitable for adaptation to an instrument panel, increasing freedom of design.

Next, a display device of a second embodiment according to the present invention will be described with reference to the accompanying drawings of FIGS. 12 and 13.

Figure 12:
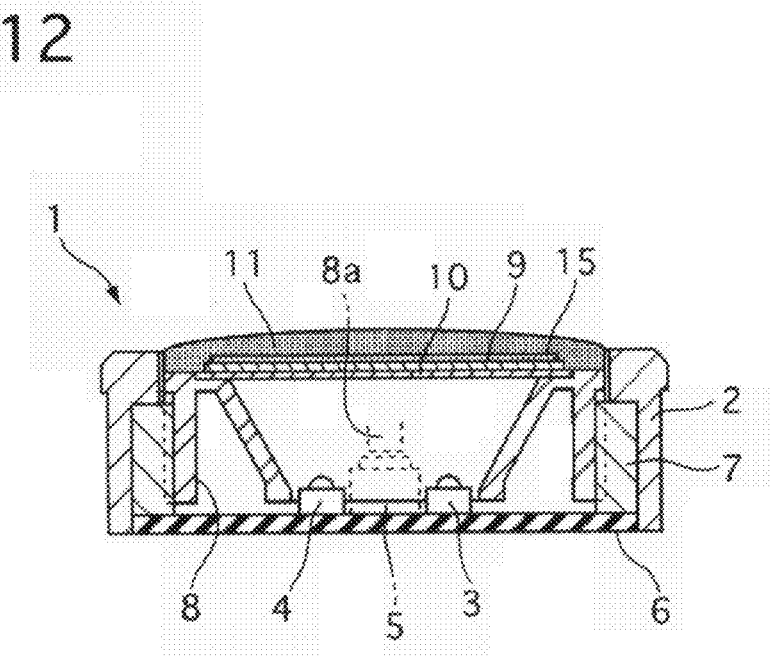
FIG. 12 is a cross-sectional view of a switch with a display device of a second embodiment according to the present invention.

As shown in FIG. 12, in the display device of the second embodiment, a red filter 15 is arranged at a display side, namely at a front side of a fluorescent filter 9, specifically between the fluorescent filter 11 and a smoked lens 11, and is used for providing a display in red. The red filter 15 corresponds to an additive color filter of the present invention.

The other parts are constructed similarly to those of the display device of the first embodiment.

The operation of the display device of the second embodiment will be described.

In this embodiment, when a first light source 3 and a second light source 4 are not supplied with the electric power, no display is produced.

In order to provide a first display, for example a first character "A", the first light source 3 is supplied with electric power and electric power supplied to the second light source 4 is cut by shifting a switch 1.

The first light source 3 emits first light, namely blue light in the second embodiment, in all possible directions. The blue light pass through a transparent sheet of a color filter 10 and hit a first to third printed area parts and a background printed area parts formed on a front surface of the transparent sheet, which are constructed similarly to those of the display device of the first embodiment.

As shown in FIG. 13, the blue light passes through the first printed area parts and the third printed area parts, and enters the fluorescent filter 9. Then some of the blue light hits fluorescent substance contained in the fluorescent filter 9 to erect it and emit yellow light, while the rest of the blue light passes through without hit on the fluorescent substance, not changing its color. Accordingly, the blue light and the yellow light emerging through the fluorescent filter 9 are mixed up with each other into white light because of additive color process of three primary colors. Then the white light passes through the red filter 15 to convert into red light. Therefore, a user can see the first display, namely the first character "A", in red through the smoked lens 11.

In order to provide a second display, for example a second character "E", the switch 1 is shifted so that the first light source 3 is not supplied with the electric power and the second light source 4 is supplied with the electric power. The second light source 4 emits second light in red and enters the color filter 10, where the first printed area parts block out the red light, the second printed area parts passes it therethrough without changing its color, and the third printed area parts dims and passes the red light therethrough. Then the red light passes through the fluorescent filter 9 without erecting its fluorescent substance, accordingly emerging therethrough without changing its color. Therefore, the user can see the second display, namely the second character "E" in red through the smoked lens 11.

The display device of the second embodiment has the following advantages.

The display device of the second embodiment is constructed to add the red filter 15 to a structure of the display device of the first embodiment so that the red filter 15 is arranged at the front side of the color filter 10 to add another color to the white light. Therefore, the display device can provide the first and second displays, which are different in contents, in the same colors. In this case, the contents of the first and second displays preferably belong to the same category or to similar categories.

In addition, the first light and the second light can be easily produced to have colors slightly different from each other by changing the.

Further, the color of the first display can be easily varied widely by changing the color of the additive color filter, thereby expanding display performance of the display device. Incidentally, the white light enables the color of the second display to be easily and purely changed into other colors, and accordingly improving display ability of the display device.

In the embodiments, in order to clearly provide the first display in white, it is preferable to arrange the printed area parts 10a to 10c, the fluorescent filter 9 and the smoked lens 11 in this order from the first and second light sources 3 and 4 toward eyes of a user, as shown in the display devices of the first and second embodiments.

Figure 14:
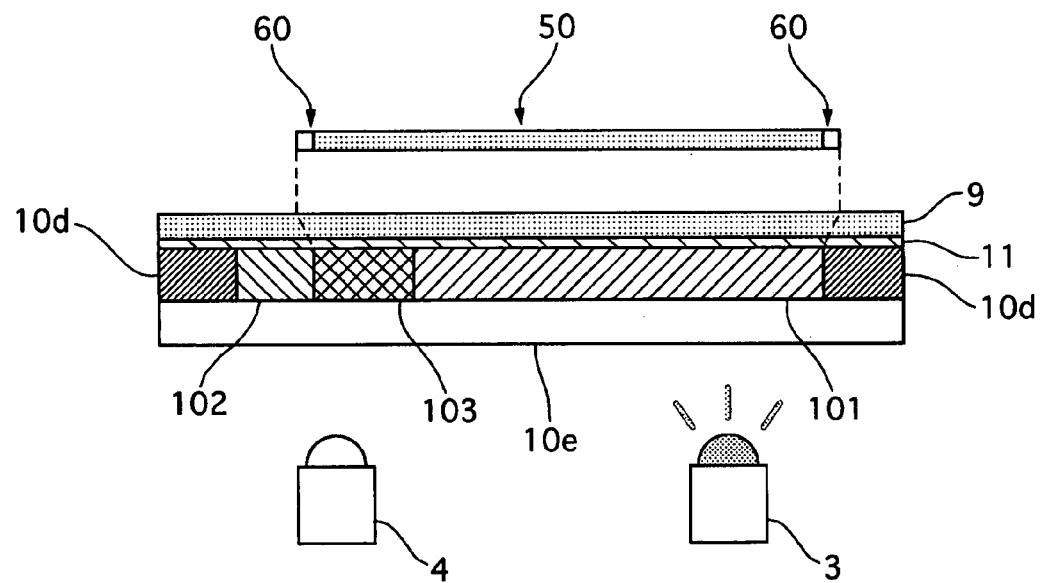
FIG. 14 is a cross-sectional side view explaining a first display provided by a display device having layers arranged differently from those of the first and second display devices.

When the smoked lens 11 is arranged between front surfaces of the printed area parts and the rear surface of the fluorescent filter 9 as shown in FIG. 14, a first display is provided to have its obscure and broadened peripheral portion under the first light. The first display has a first area 50 and a second area 60, which are schematically represented as the first display for easy understanding, and accordingly they are not a material object. The first area 50 would be a displayed area if a broadening angle of the first light is zero, that is the light passing through the printed area parts is not refracted. The second area 60 is displayed in an obscure state, expanding outwardly from an outer periphery of the first area 50, because the first light is refracted by the smoked lens 11 and the fluorescent filter 9 to increase the broadening angle as indicated by a chained line and emit the white light in all possible directions by the fluorescent substance of the fluorescent filter 9. Therefore, the fluorescent white light can enter the eyes of a user, which causes the first display to be provided obscurely at an outer peripheral portion thereof, decreasing contrast between the first display and its background.

When the second light source 4 is supplied with electric power, a second light is also refracted by the smoked lens 11 and the fluorescent filter 9 to increase the broadening angle. However, the red light as the second light, different from the blue light, does not emit the fluorescent light when it passes through the fluorescent filter 9, and its broadened light does not enter the eyes of the user because it travels straightly. Therefore, a second display is provided in red without no obscure peripheral portion thereof.

Incidentally, the printed area parts of the display device shown in FIG. 14 include the blue printed area parts 101, the red printed area parts 102 and the dimmer control printed area parts 103, and are formed on the front surface of the translucent sheet 10e.

Figure 15:
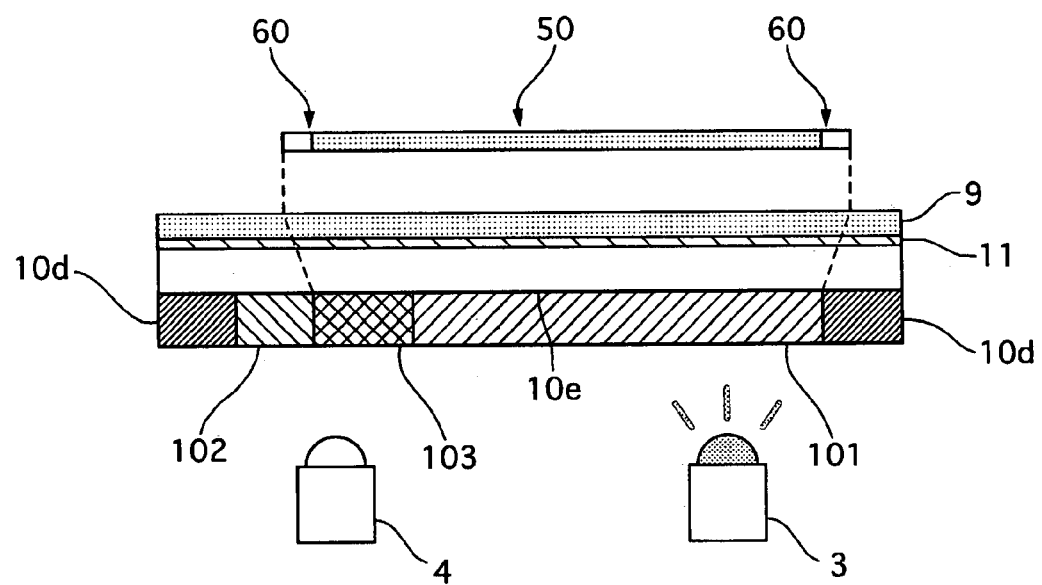
FIG. 15 is a cross-sectional side view showing a first display provided another display having layers arranged differently from those of the first and second display devices.

On the other hand, when the smoked lens 11 is arranged between the front surface of the translucent sheet 10e and the rear surface of the fluorescent sheet 9 as shown in FIG. 15, the first display is also provided to have its obscure and broadened peripheral portion under the first light in blue. It is schematically represented by the first area 50 and the second area 60, and the second area 60 becomes larger in area than that shown in FIG. 14, because the first light travels through the translucent sheet 10e, the smoked lens 11 and the fluorescent filter 9, which becomes a longer distance, being refracted thereby. When the second light source 4 is supplied with electric power, a second display is provided in different color, red for example, but has no obscure portion thereof because the second light does not erect the fluorescent substance of the fluorescent filter 9 when it passes therethrough.

Incidentally, the printed area parts of the display device shown in FIG. 15 are arranged on the rear surface of the translucent sheet 10e.

Figure 16:
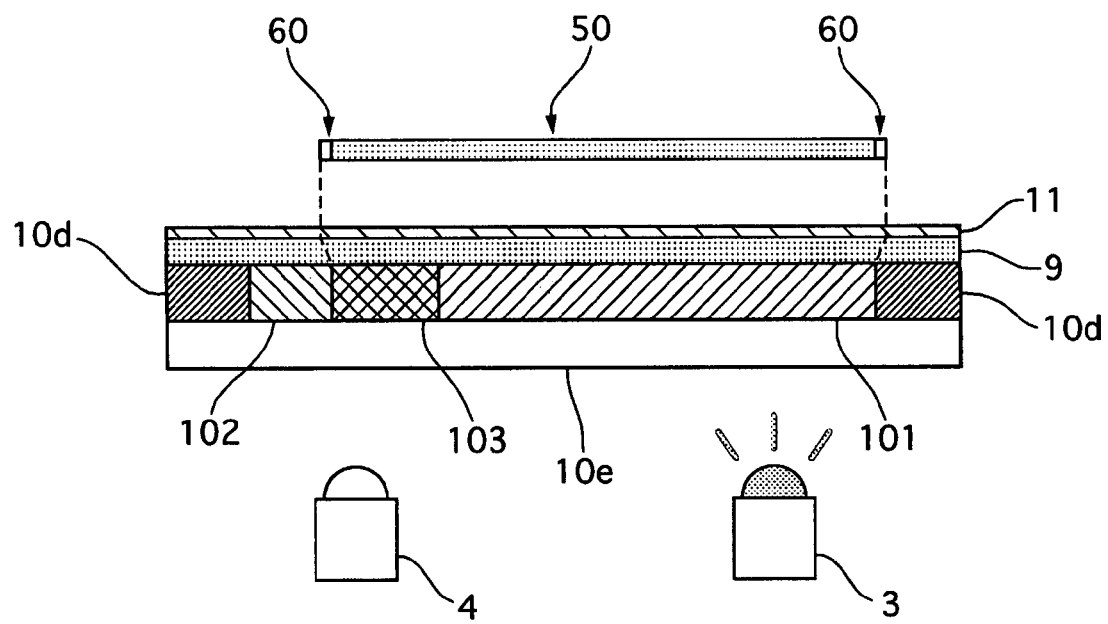
FIG. 16 is a cross-sectional side view a display state where a first display is provided by the display device of the first embodiment.

FIG. 16 shows a display state of the display device of the first embodiment.

The first light is refracted broadened by substantially only the fluorescent filter 9, and accordingly its second area 60 of the first display becomes smaller in area than those of the display devices shown in FIGS. 14 and 15. Therefore, the first display device can suppress the obscure and broadened portions of the first display, improving contrast between the first display and its background. Incidentally, the second display is provided without an obscure peripheral portion thereof although it is broadened.

Figure 17:
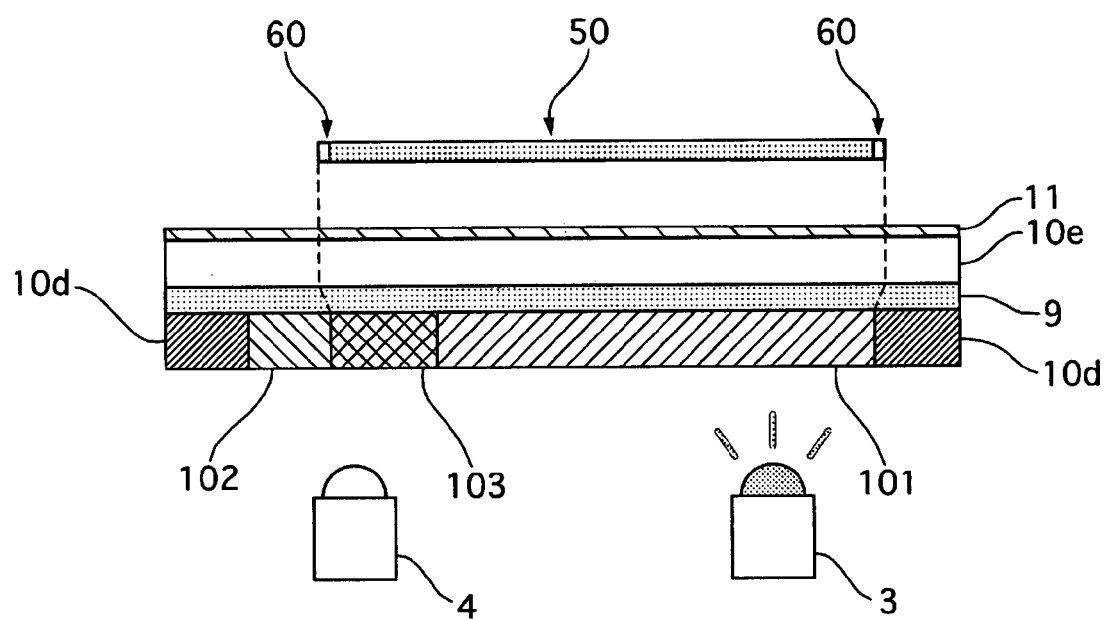
FIG. 17 is a cross-sectional side view showing a display device of a third embodiment according to the present invention.

Next, a display device of a third embodiment will be described with reference to the accompanying drawings of FIG. 17.

The display device of the third embodiment has printed area parts including blue printed area parts 101, red printed area parts 102, dimmer control printed area parts 103 and background printed area parts 10d, a fluorescent filter 9 arranged on a front surfaces of the printed area parts, a translucent sheet 10e arranged on a front surface of the fluorescent sheet 9, and a smoked lens 11 arranged on a front surface of the translucent sheet 10e.

In this case, a second area 60, namely an obscure and broadened portion of a first display, can be decreased in area and in obscureness relative to that shown in FIGS. 14 and 15.

Therefore, the display devices of the embodiments can provide more clearly the first display even when they uses the fluorescent filter 9, improving contrast thereof.

Figure 18A:
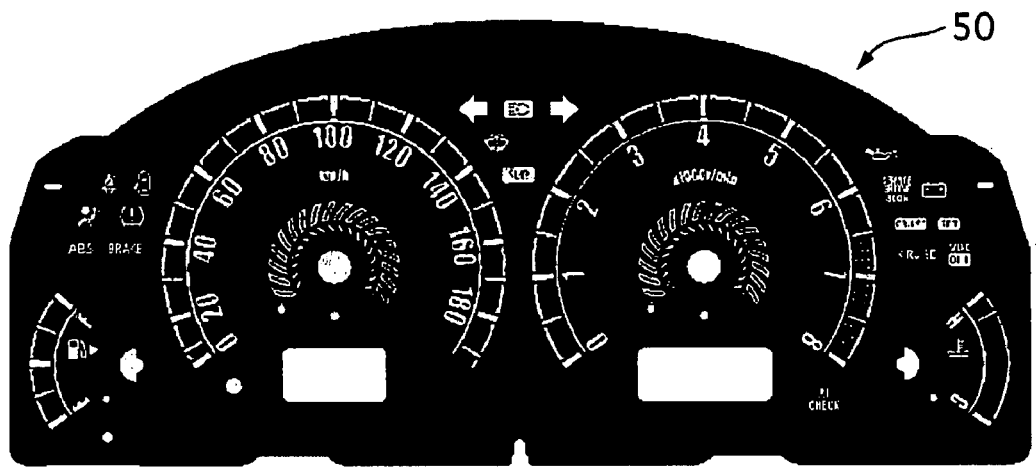
FIG. 18A is a front view showing an instrument panel, for which the display device of the first embodiment is adapted, when a first light source is supplied with electric power to provide a first display in white.
Figure 18B:
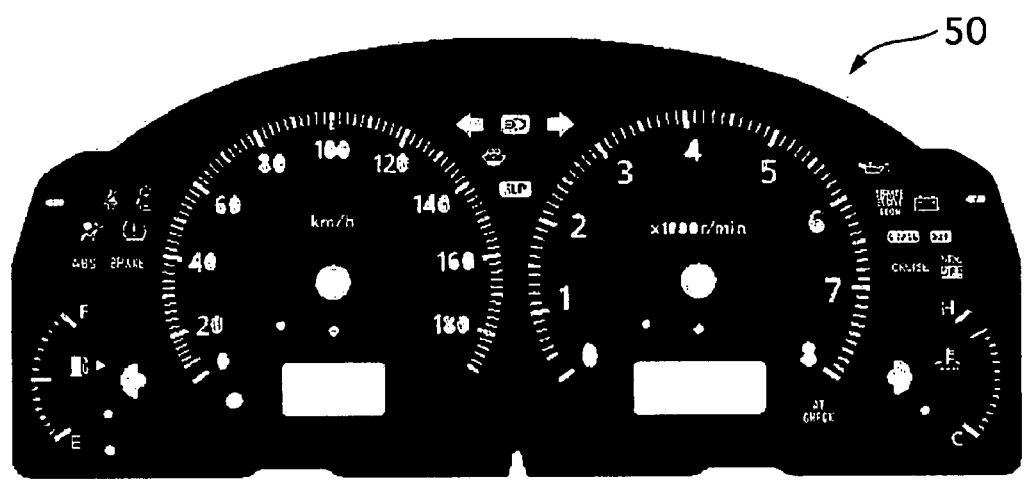
FIG. 18B is a front view showing the instrument panel when the second light source is supplied with the electric power to provide a second display in red.

The display devices of the embodiments can be adapted for an instrument panel of a motor vehicle, for example, as shown in FIGS. 18A and 18B.

The instrument panel 70 uses the display device of the embodiments and selectively provides meter scale displays in white and in red. The meter scale displays are designed differently from each other so that a user can select his or her favorite one of so that they can be changed according to use conditions, allowing for visibility. For example, FIG. 18A shows the meter scale display in white, and FIG. 18B shows the meter scale display in red. Therefore, the instrument panel 70 with the display device can easily change colors and patterns of the display.

Figure 19A:
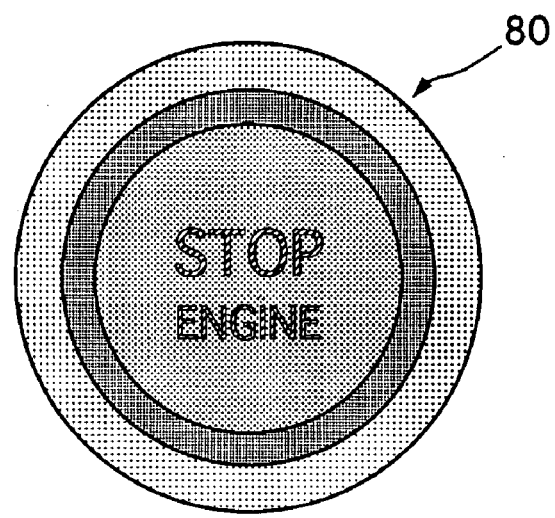
FIG. 19A is a front view showing an engine starting switch, for which the display device of the first embodiment is adapted, when the first light source is supplied with the electric power to provide a first display in white.
Figure 19B:
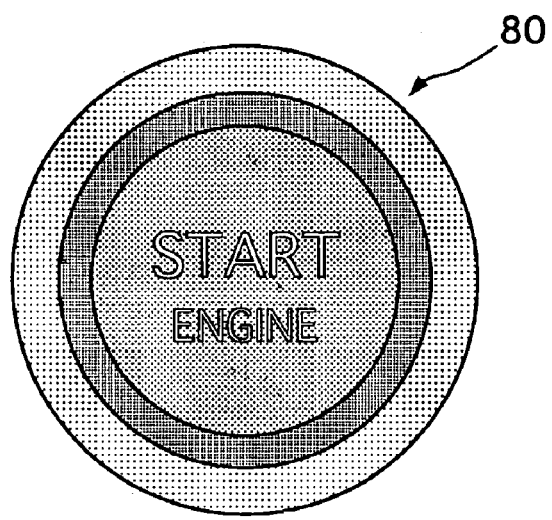
FIG. 19B is a front view showing the engine starting switch when the second light source is supplied with the electric power to provide a second display in red.

The display devices of the embodiments can also be adapted for an engine start switch. FIG. 19A shows the engine start switch 80 in a state where a first display, namely first characters "START ENGINE", is provided in white, and FIG. 19B shows that in a state where a second display, namely second characters "STOP ENGINE", is provided in red.

The first and second displays do not need to be lessened when they are overlapped, improving visibility.

While there have been particularly shown and described with reference to preferred embodiments thereof, it will be understood that various modifications may be made therein, and it is intended to cover in the appended claims all such modifications as fall within the true spirit and scope of the invention.

For example, the first and second light sources 3 and 4 of the first and second embodiments are set to emit light having peak wavelength of about 470 nm and light having peak wavelength of about 640 nm, but they may use a light source capable of emitting light having characteristics of different peak wavelength, other colors, such as green.

The number of light sources and printed area parts of a color filter may be set arbitrarily.

Printed area parts, such as the first printed area parts 10a, the second printed area parts 10b, the third printed area parts 10c and the background printed area parts 10d may be formed by using any one of silk-screen print making, relief printing, or ink jet printing.

The fluorescent filter 9 and the additive color filter 15 may be formed by printing or pre-formed by a filter material.

The printed area parts, the translucent sheet 10e, the fluorescent filter 9 and the smoked lens 11 do not need to be directly contacted with a facing one thereof, and may be slightly apart from the one.

The first display 12 and the second display 13 are not limited to "A" and "E", may be replaced by other contents, including marks, graphic symbols, and others.

The entire contents of Japanese Patent Application No. 2006-093218 filed Mar. 30, 2006 and 2006-260543 filed Sep. 26, 2006 are incorporated herein by reference.

What is claimed is:

1. A display device that selectively provides a first display and a second display, the display device comprising:
   a first light source for emitting first light in blue;
   a second light source for emitting second light with peak wavelength different from wavelength of the first light; and
   a color filter having a translucent sheet that is hit selectively by one of the first and second lights, the translucent sheet being provided with
   a first printed area part which is capable of passing the first light to provide the first display excluding an overlapped portion of the first display and the second display and preventing the second light from passing through the first printed area part,
   a second printed area part which is capable of passing the second light to provide the second display excluding the overlapped portion and preventing the first light from passing through the second printed area part,
   a third printed area part which is capable of dimming and passing the first light and the second light to provide the overlapped portion,
   a background printed area part which is capable of preventing the first light and the second light from passing through the background printed area part, and
   a white light converting part which is capable of converting the first light passing through the white light converting part into white light, wherein
   the white light converting part is a fluorescent filter, and wherein
   the white light converting part is provided on a display side thereof with an additive color filter which is capable of changing the white light to another color light.

2. The display device according to claim 1, wherein the additive color filter produces the first display in the substantially same color as color of the second display.

3. The display device according to claim 2, further comprising:
   a smoked filter which has a low translucency of light, wherein
   the first to third printed area parts, the white light converting part and the smoked filter are arranged in order thereof to form a layer structure so that broadening of the first and second lights passing through the printed area parts and entering the fluorescent filter can be suppressed.

4. The display device according to claim 1, wherein the additive color filter produces the first display in color different from color of the second display.

5. The display device according to claim 4, further comprising:
   a smoked filter which has a low translucency of light, wherein
   the first to third printed area parts, the white light converting part and the smoked filter are arranged in order thereof to form a layer structure so that broadening of the first and second lights passing through the printed area parts and entering the fluorescent filter can be suppressed.

6. A display device that selectively provides a first display and a second display, the display device comprising:
   a first light source for emitting first light in blue;
   a second light source for emitting second light with peak wavelength different from wavelength of the first light; and
   a color filter having a translucent sheet that is hit selectively by one of the first and second lights, the translucent sheet being provided with
   a first printed area part which is capable of passing the first light to provide the first display excluding an overlapped portion of the first display and the second display and preventing the second light from passing through the first printed area part,
   a second printed area part which is capable of passing the second light to provide the second display excluding the overlapped portion and preventing the first light from passing through the second printed area part,
   a third printed area part which is capable of dimming and passing the first light and the second light to provide the overlapped portion,
   a background printed area part which is capable of preventing the first light and the second light from passing through the background printed area part, and
   a white light converting part which is capable of converting the first light passing through the white light converting part into white light, wherein
   the white light converting part is provided on a display side thereof with an additive color filter which is capable of changing the white light to another color light.

7. The display device according to claim 6, wherein the additive color filter produces the first display in the substantially same color as color of the second display.

8. The display device according to claim 4, further comprising:
   a smoked filter which has a low translucency of light, wherein the first to third printed area parts, the white light converting part and the smoked filter are arranged in order thereof to form a layer structure so that broadening of the first and second lights passing through the printed area parts and entering the fluorescent filter can be suppressed.

9. The display device according to claim 6, wherein the additive color filter produces the first display in color different from color of the second display.

10. The display device according to claim 9, further comprising:

a smoked filter which has a low translucency of light, wherein the first to third printed area parts, the white light converting part and the smoked filter are arranged in order thereof to form a layer structure so that broadening of the first and second lights passing through the printed area parts and entering the fluorescent filter can be suppressed.

11. A display device that selectively provides a first display and a second display, the display device comprising:

a first light source for emitting first light in blue;

a second light source for emitting second light with peak wavelength different from wavelength of the first light; and a color filter having a translucent sheet that is hit selectively by one of the first and second lights, the translucent sheet being provided with a first printed area part which is capable of passing the first light to provide the first display excluding an overlapped portion of the first display and the second display and preventing the second light from passing through the first printed area part, a second printed area part which is capable of passing the second light to provide the second display excluding the overlapped portion and preventing the first light from passing through the second printed area part, a third printed area part which is capable of dimming and passing the first light and the second light to provide the overlapped portion, a background printed area part which is capable of preventing the first light and the second light from passing through the background printed area part, and a white light converting part which is capable of converting the first light passing through the white light converting part into white light; and a smoked filter which has a low translucency of light, wherein the first to third printed area parts, the white light converting part and the smoked filter are arranged in order thereof to form a layer structure so that broadening of the first and second lights passing through the printed area parts and entering the fluorescent filter can be suppressed.

* * * * *